(12) United States Patent
Milicevic et al.

(10) Patent No.: US 9,643,879 B2
(45) Date of Patent: May 9, 2017

(54) METHOD FOR MANUFACTURING A PRECURSOR FOR A PRIMARY PREFORM FOR OPTICAL FIBRES BY A PLASMA DEPOSITION PROCESS

(71) Applicant: Draka Comteq B.V., Amsterdam (NL)

(72) Inventors: Igor Milicevic, Amsterdam (NL); Mattheus Jacobus Nicolaas Van Stralen, Amsterdam (NL); Johannes Antoon Hartsuiker, Amsterdam (NL); Gertjan Krabshuis, Amsterdam (NL)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 14/313,095

(22) Filed: Jun. 24, 2014

(65) Prior Publication Data

US 2015/0315060 A1   Nov. 5, 2015

(30) Foreign Application Priority Data

Jul. 1, 2013   (NL) ..................................... 2011077

(51) Int. Cl.
*C03B 37/018*   (2006.01)

(52) U.S. Cl.
CPC ........ *C03B 37/018* (2013.01); *C03B 37/0183* (2013.01); *C03B 37/01861* (2013.01); *C03B 37/01869* (2013.01)

(58) Field of Classification Search
CPC ............................. C03B 37/0183; C03B 37/07
See application file for complete search history.

(56) References Cited

U.S. PATENT DOCUMENTS

| | | | | |
|---|---|---|---|---|
| 4,148,621 | A | * | 4/1979 | Gliemeroth ....... C03B 37/01807 65/417 |
| 4,292,063 | A | * | 9/1981 | Abe .................. C03B 37/01807 427/575 |
| 4,314,833 | A | | 2/1982 | Kuppers |
| 4,349,373 | A | * | 9/1982 | Sterling .............. C03B 37/0183 427/137 |
| 2007/0003197 | A1 | | 1/2007 | Matthijsse et al. |
| 2009/0126407 | A1 | | 5/2009 | Bookbinder et al. |

FOREIGN PATENT DOCUMENTS

| | | |
|---|---|---|
| EP | 0165510 A1 | 12/1985 |
| EP | 1801081 A1 | 6/2007 |
| EP | 1988064 A1 | 5/2008 |
| EP | 2008978 B1 | 9/2010 |
| WO | 99/35304 | 7/1999 |

* cited by examiner

*Primary Examiner* — John Hoffmann
(74) *Attorney, Agent, or Firm* — Shumaker, Loop & Kendrick, LLP

(57) ABSTRACT

A method for manufacturing a precursor for a primary preform for optical fibers by an internal plasma deposition process including the steps of providing a hollow substrate tube, creating a first plasma reaction zone having first reaction conditions and depositing non-vitrified silica layers along at least a portion of the inner surface of the substrate tube, subsequently creating a second plasma reaction zone having second reaction conditions different from the first reaction conditions and depositing vitrified silica layers along at least a portion of the substrate tube, and cooling the substrate tube to produce the precursor for a primary preform.

11 Claims, No Drawings

METHOD FOR MANUFACTURING A PRECURSOR FOR A PRIMARY PREFORM FOR OPTICAL FIBRES BY A PLASMA DEPOSITION PROCESS

CROSS-REFERENCE TO RELATED APPLICATION

This application claims priority from Dutch Patent Application No. 2011077 filed Jul. 1, 2013, the contents of which are incorporated by reference herein.

TECHNICAL FIELD AND BACKGROUND OF THE INVENTION

The present invention relates to a method for manufacturing a precursor for a primary preform for optical fibres by means of an internal plasma deposition process, such as a plasma chemical vapour deposition (PCVD) process. The present invention moreover relates to a method for manufacturing a primary preform for optical fibres by means of an internal plasma deposition process.

The present invention relates generally to the field of optical fibres, and more particularly, to the field of manufacturing optical fibres by means of chemical vapour deposition. There are several types of chemical vapour deposition (CVD) known, such as outside vapour deposition (OVD), vapour axial deposition (VAD), modified chemical vapour deposition (MDVD), and plasma-enhanced chemical vapour deposition (PECVD or PCVD). Plasma-enhanced chemical vapour deposition (PECVD or PCVD) is a process used to deposit thin films from a gas state (vapour) to a solid state on a substrate. Chemical reactions are involved in the process, which occur after creation of a plasma of the reacting gases.

Generally, in the field of optical fibres, multiple thin films of glass are deposited on the inside surface of a substrate tube. The substrate tube is hollow to allow internal deposition. The substrate tube may be glass, preferably glass quartz ($SiO_2$). Glass-forming gases (i.e., reactive gases comprising gasses for the forming of glass and optionally precursors to dopants) are introduced into the interior of the substrate tube from one end (called the "supply side" of the substrate tube). Doped or undoped glass layers (depending on the use of reactive gases with or without one or more precursors to dopants, respectively) are deposited onto the interior surface of the substrate tube. The remaining gases are discharged or removed from the other end of the substrate tube (called the "discharge side" of the substrate tube). The removal is optionally carried out by means of a vacuum pump. The vacuum pump has the effect of generating a reduced pressure in the interior of the substrate tube, which reduced pressure generally comprises a pressure value ranging between 5 and 50 mbar.

Generally, the plasma is induced by the use of electromagnetic radiation, e.g. microwaves. Generally, electromagnetic radiation from a generator is directed towards an applicator via a waveguide, which applicator surrounds the substrate tube. The applicator couples the electromagnetic energy into a plasma that is generated inside the substrate tube. The applicator is moved reciprocally in the longitudinal direction of the substrate tube. Thus, the plasma formed, also called the "plasma reaction zone", is also moved reciprocally. As a result of this movement, a thin vitrified silica layer is deposited onto the interior of the substrate tube with every stroke or pass.

The applicator and the substrate tube are generally surrounded by a furnace so as to maintain the substrate tube at a temperature of 900-1300° C. during the deposition process.

Thus, the applicator is moved in translation over the length of the substrate tube within the boundaries of a furnace which surrounds the substrate tube and the applicator reciprocating within the furnace. With this translational movement of the applicator the plasma also moves in the same direction. As the applicator reaches the inner wall of the furnace near one end of the substrate tube, the movement of the applicator is reversed so that it moves to the other end of the substrate tube towards the other inner wall of the furnace. In other words, the applicator and thus the plasma is reciprocating between a reversal point at the supply side and a reversal point at the discharge side of the substrate tube. The applicator and thus the plasma travels in a back and forth movement along the length of the substrate tube. Each back and forth movement is call a "pass" or "stroke". With each pass a thin layer of non-vitrified or vitrified silica material is deposited on the inside of the substrate tube.

This plasma causes the reaction of the glass-forming gases (e.g. $O_2$, $SiCl_4$ and e.g. a precursor for a dopant, such as $GeCl_4$ or other gases) that are supplied to the inside of the substrate tube. The reaction of the glass-forming gases allows reaction of Si (Silicon), O (Oxygen) and e.g. the dopant Ge (Germanium) so as to thus effect direct deposition of, for example, Ge-doped SiOx on the inner surface of the substrate tube.

Normally, a plasma is generated only in a part of the substrate tube, such as the part that is surrounded by the applicator. The dimensions of the applicator are smaller than the dimensions of the furnace and of the substrate tube. Only at the position of the plasma are the reactive gasses converted into solid glass and deposited on the inside surface of the substrate tube. Since the plasma reaction zone moves along the length of the substrate tube, glass is deposited more or less evenly along the length of the substrate tube.

When the number of passes increases, the cumulative thickness of these thin films, i.e. of the deposited material, increases; thus leading to a decrease in the remaining internal diameter of the substrate tube. In other words, the hollow space inside the substrate decreases with each pass.

After the vitrified silica layers have been deposited onto the interior of the substrate tube, the substrate tube is subsequently contracted by heating into a solid rod ("collapsing"). The remaining solid rod is called a primary preform. In a special embodiment, the solid rod or primary preform may furthermore be externally provided with an additional amount of glass, for example, by means of an external vapour deposition process or direct glass overcladding (so-called "overcladding") or by using one or more preformed glass tubes (so-called "sleeving"), thus obtaining a composite preform called the final preform. From the final preform, one end of which is heated, optical fibres are obtained by drawing on a drawing tower. The refractive index profile of the consolidated (final) preform corresponds to the refractive index profile of the optical fibre drawn from such a preform.

One way of manufacturing an optical preform by means of a PCVD process is known from U.S. Pat. No. 4,314,833. According to the process that is known from that document, one or more doped or undoped glass layers are deposited onto the interior of a substrate tube, using a low-pressure plasma in the substrate tube.

According to International application WO 99/35304 microwaves from a microwave generator are directed towards an applicator via a waveguide, which applicator surrounds a substrate tube. The applicator couples the electromagnetic energy into the plasma.

The inventors have observed that these prior art plasma deposition processes lead to the deposition of irregular glassified material occurring in an area upstream of a reversal point at the supply side of the substrate tube and in an area downstream of a reversal point at the discharge side of the substrate tube (manifested as an opaque ring on the inner surface of the hollow substrate tube called a "soot ring"). These soot rings are observed outside of the area that is to be used for drawing optical fibres. At the discharge side of the primary preform an area is observed having a higher doped silica which is prone to cracking. This is disclosed in more detail in Dutch patent application 2010724 from the present inventors. Without wishing to be bound to any particular theory, it is assumed that such soot ring deposition takes place as a result of the relatively low intensity of the plasma in the region where the soot deposition takes place. It is further assumed that the temperature on the inner surface of the hollow substrate tube at the reversal points plays an important part in the formation of such a soot ring. A major drawback of the soot ring deposition is that there is a significant risk of fracture of glass layers, which means a loss of the total preform rod, which is undesirable.

Layer cracking is attributed to the fact that a high stress level will cause fracture at the location of any irregularities in the glass, which irregularities occur in particular in soot rings.

Since the current commercial trend in manufacturing of optical fibre preforms tends to go towards larger (thicker preforms), more passes or strokes are required. This leads to tubes after deposition (before collapsing) having an even smaller internal diameter and even thicker soot ring. The problem of cracking is becoming more and more pressing.

This problem has been recognized previously and several solutions have been proposed in the prior art, some of which are discussed below.

One solution includes increasing the temperature of the plasma deposition furnace for subsequent depositions at either the supply side or the discharge side or both (depending on where the cracking occurs) when cracking is observed in the region of the soot ring during collapsing. This increase in temperature can only partly solve the problem. There are limits to the amount of temperature increase and the temperature difference between the middle part of the plasma deposition furnace and one or both ends (supply and/or discharge side).

Another solution is proposed in EP 1 988 064 by the present inventors. This document relates to the axial variation of the reversal point(s) during different phases (passes) of the glass deposition. In other words, the deposition of the soot ring is spread out over a larger area and hence the chance of cracking is reduced. For each phase of the deposition process (e.g. for the deposition of the core and for the deposition of the cladding) the reversal points at the supply side is moved, thereby providing a different placement of the soot ring. This method is very useful, but could lead to a number of adjacent soot rings that could decrease the effective length of the preform.

Yet another solution is proposed in EP 1 801 081 by the present inventors. The solution of this patent is the use of a so-called "insertion tube", being a tube that is inserted at the supply side of the substrate tube inside of the hollow substrate tube. The effect is that the material forming the soot ring is partly deposited inside of the insertion tube and can easily be removed with the removal of the insertion tube. This method is very useful, but in some cases could lead to undesirable deposition oscillation.

Yet another solution is proposed in EP 2 008 978 by the present inventors. This method applies an etching step between two separate phases during which etching step any non-uniformities are removed from the substrate tube. The etching is carried out by an etching gas. This method is very useful in a large number of applications. However, for the mere removal of a soot ring this method is labor intensive and costly.

US 2009/0126407 A1 by Corning Inc. discloses a method of making an optical fiber preform which includes depositing silica glass on the inside of a substrate tube via a plasma chemical vapour deposition (PCVD) operation. The parameters of the PCVD operation are controlled such that the silica glass deposited on the interior of the substrate tube contains a non-periodic array of voids in a cladding region of the optical fiber preform. The optical fiber preform may be used to produce an optical fiber having a core and a void containing cladding. The core of the optical fiber has a first index of refraction and the cladding has a second index of refraction less than that of the core.

Therefore, there is a need for an alternative solution to the problem discussed above.

BRIEF SUMMARY OF THE INVENTION

It is an object of the present invention to provide a method for manufacturing a preform for optical fibres in which the occurrence of the undesirable fracture of glass layers is minimized.

It is another object of the present invention to provide a method of manufacturing a preform for optical fibres in which a preform having a maximum effective preform length for drawing optical fibres therefrom is obtained.

It is another object of the present invention to provide a method of manufacturing a preform for optical fibres in which a preform having a maximum thickness for drawing optical fibres therefrom is obtained that is less prone to cracking.

One or more of the above objects are achieved by the present invention.

The present invention relates, in a first aspect, to a method for manufacturing a precursor for a primary preform for optical fibres by means of an internal plasma deposition process, the method including the steps of:

i) providing a hollow substrate tube having a supply side and a discharge side;

ii) creating a first plasma reaction zone having first reaction conditions in the interior of the hollow substrate tube by means of electromagnetic radiation for effecting the deposition of non-vitrified silica layers on at least part of the inner surface of the substrate tube at or near a reversal point of the discharge side and depositing non-vitrified layers on at least a part of the inner surface thereof; and subsequently iii) creating a second plasma reaction zone having second reaction conditions in the interior of the hollow substrate tube by means of electromagnetic radiation for effecting the deposition of vitrified silica layers on the substrate tube and depositing vitrified silica layers on at least a part of the inner surface thereof obtained in step ii); and iv) cooling the substrate tube having deposited non-vitrified and vitrified silica layers obtained in step iii) to obtain the precursor for a primary preform. The first reaction conditions may be different from the second reaction conditions, for example, in terms of pressure, and at least a portion of the vitrified silica layers may be deposited on top of at least a portion of the non-vitrified silica layers.

In a second aspect, the present invention relates to a method for manufacturing a primary preform for optical fibres by means of an internal plasma deposition process, the method including the steps of:

i) providing a hollow substrate tube having a supply side and a discharge side;

ii) creating a first plasma reaction zone having first reaction conditions in the interior of the hollow substrate tube by means of electromagnetic radiation for effecting the deposition of non-vitrified silica layers on at least part of the inner surface of the substrate tube at or near a reversal point of the discharge side to provide a substrate tube having non-vitrified layers on at least a part of its inner surface; and subsequently iii) creating a second plasma reaction zone having second reaction conditions in the interior of the hollow substrate tube by means of electromagnetic radiation for effecting the deposition of vitrified silica layers on the substrate tube having non-vitrified layers on at least a part of its inner surface obtained in step ii) to obtain a substrate tube having deposited non-vitrified and vitrified silica layers;

iv) cooling the substrate tube having deposited non-vitrified and vitrified silica layers obtained in step iii) to obtain a precursor for a primary preform; and v) subjecting the precursor for a primary preform obtained in step iv) to a collapsing treatment to obtain a primary preform.

The second aspect of the present invention relates to a method for manufacturing a primary preform for optical fibres by means of an internal plasma deposition process whereby the precursor for a primary preform obtained in step iv) of the first aspect of the present invention is subjected to a collapsing treatment, resulting in a solid primary preform. During the collapsing step the non-vitrified layers are vitrified.

Embodiments of these aspects are discussed below. It should be noted that the embodiments are applicable, if possible, to each of these aspects.

In one embodiment, the electromagnetic radiation used is microwaves.

In one aspect, the non-vitrified layers deposited in step ii) may be deposited along only a portion of the inner surface of the substrate tube. At least a portion of the inner surface at or near a reversal point at the discharge side may be provided with non-vitrified layers. A portion of the inner surface at or near a reversal point at the supply side may be provided with non-vitrified layers.

In another aspect, the non-vitrified layers deposited in step ii) may be deposited on substantially the entire inner surface of the substrate tube. Thus, the non-vitrified layers may be supplied on a large part of the inner surface of the substrate tube, such as between the reversal point near the supply side and the reversal point near the discharge side.

In another aspect, a portion of the deposited non-vitrified layers may be etched away.

In a further embodiment, the method according to the present invention further includes, between step ii) and step iii), the step of etching away, at least part of, the non-vitrified silica layers deposited in step ii) along at least part of the inner surface of said substrate tube. In other words, the etching step occurs after step ii) and prior to step iii).

In a further embodiment, provided herein is a method for manufacturing a precursor for primary preform for optical fibres by means of an internal plasma deposition process, the method including the steps of:

i) providing a hollow substrate tube having a supply side and a discharge side;

ii) creating a first plasma reaction zone having first reaction conditions in the interior of the hollow substrate tube by means of electromagnetic radiation for effecting the deposition of non-vitrified silica layers on at least a portion of the inner surface of the substrate tube at or near a reversal point at the discharge side to provide a substrate tube having non-vitrified layers on at least a portion of the inner surface thereof;

A) etching away the non-vitrified silica layers deposited in step ii) on at least a portion of the inner surface of the substrate tube;

iii) creating a second plasma reaction zone having second reaction conditions in the interior of the hollow substrate tube by means of electromagnetic radiation for effecting the deposition of vitrified silica layers on the substrate tube having non-vitrified layers on at least a portion of the inner surface obtained in step ii) to obtain a substrate tube having deposited non-vitrified and vitrified silica layers; and iv) cooling the substrate tube having deposited non-vitrified and vitrified silica layers obtained in step iii) to obtain a precursor for a primary preform.

In a further aspect, the method includes a collapsing treatment step to obtain a primary preform.

In a further aspect, the method includes an additional step B) after step ii) and prior to step iii) including vitrifying the non-vitrified silica layers deposited in step ii) on at least a portion of the inner surface of the substrate tube. In other words, step B) includes vitrifying at least part of the non-vitrified silica layers deposited in step ii). The vitrifying step B) may be practiced along with or independent of the etching step A), and along with or independent of the collapsing step.

According to the above embodiments, non-vitrified silica layers may be etched away from at least a portion of the inner surface of the substrate tube and/or may be vitrified on at least a portion of the inner surface of said substrate tube. Either way, no non-vitrified silica layers remain after these steps have been carried out on at least a portion of the inner surface of the substrate tube.

In a further aspect, the portion no longer containing non-vitrified silica layers may be the portion between a longitudinal position 200 mm upstream of the reversal point near the discharge side and a longitudinal position 200 mm downstream of the reversal point near the supply side, preferably 100 mm and 100 mm, more preferably 50 mm and 50 mm.

In other words, the non-vitrified silica layers are maintained on at least part of the inner surface of the substrate tube between a reversal point near the discharge side and a longitudinal position 200 mm upstream of the reversal point, preferably 100 mm, more preferably 50 mm.

In other words, the non-vitrified silica layers are not etched away or not vitrified and hence maintained on at least part of the inner surface of the substrate tube between a reversal point near the supply side and a longitudinal position 200 mm downstream of the reversal point, preferably 100 mm, more preferably 50 mm.

In another aspect, the first reaction conditions include a pressure greater than 30 millibar, preferably greater than 60 millibar.

In another aspect, the first reaction conditions include a pressure greater than 30 millibar, preferably greater than 40 millibar, more preferably greater than 50 millibar, even more preferably greater than 60 millibar.

In another aspect, the first reaction conditions include a pressure lower than 1000 millibar, preferably lower than 800 millibar, more preferably lower than 600 millibar, even more preferably lower than 400 millibar, or even lower than 200 millibar.

In another aspect, the second reaction conditions include a pressure of between 1 and 25 millibar, preferably between 5 and 20 millibar, more preferably between 10 and 15 millibar.

In another aspect, the first reaction conditions include a pressure lower than 1000 millibar, preferably lower than 200 millibar.

In another aspect, the second reaction conditions include a pressure of between 1 and 25 millibar, preferably between 10 and 15 millibar.

In another aspect, in step ii) between 1 and 200 non-vitrified silica layers are deposited.

In another aspect, the non-vitrified silica layers each, independently, have a thickness between 1 and 5 micrometers, preferably between 2 and 3 micrometers.

In another aspect, the non-vitrified silica layers each have about the same thickness (viz. each layer has the same thickness with a margin of ±5% between the separate layers).

In another embodiment, the non-vitrified silica layers each have about the same volume (viz. each layer has the same volume with a margin of ±5% between the separate layers). When the inner space of the substrate tube decreases with the increasing number of deposited layers, the thickness of the layers may increase while the volume stays the same (decreased diameter leads to a decreased inner surface).

In another aspect, the non-vitrified silica layers deposited in total have a thickness between 1 and 400 micrometers.

The present invention further provides a precursor for a primary preform including deposited non-vitrified and vitrified silica layers on the inner surface thereof to be used for manufacturing a primary preform for optical fibres.

The following definitions are used in the present description and claims to define the stated subject matter. Other terms not cited below are meant to have the generally accepted meaning in the field.

The term "hollow substrate tube" as used herein means a, preferably elongated, tube having a cavity within. Generally, the inside of the tube is provided (or coated) with a plurality of glass layers during the manufacturing of a preform.

The term "precursor for a primary preform" as used herein means an intermediate product that leading to a primary preform after one or more additional processing steps.

The term "primary preform" as used herein means a solid rod (solid preform) that requires external glass applied thereto before becoming a final preform.

The term "final preform" as used herein means a solid rod (solid composite preform) that an be directly used for drawing optical fibers therefrom.

The term "cavity" as used herein means the space surrounded by the wall of the substrate tube.

The term "gas supply side" or "supply side" as used herein means one side of the substrate tube, being an open end of the substrate tube that is used as the inlet for gases. The supply side is the side opposite the discharge side.

The term "gas discharge side" or "discharge side" as used herein means one side of the substrate tube, being an open end of the substrate tube that is used as the outlet for gases. The discharge side is the side opposite the supply side.

The term "inner surface" as used herein means the inside surface or interior surface of the hollow substrate tube.

The term "silica" as used herein means any substance in the form of SiOx, whether or not stoichiometric, and whether or not crystalline or amorphous.

The term "glass-forming gases" as used herein means reactive gases used during the deposition process to form glass layers. Glass forming gases may comprise a precursor for a dopant. (e.g. $O_2$ and $SiCl_4$ and optionally others).

The term "precursor for a dopant" as used herein means a compound or composition that, when introduced into glass, become a dopant having an effect on the refractive index of the glass. Precursors for dopants may, for example, be gasses that react with one or more compounds in the glass-forming gasses to form doped glass layers when vitrified. During the glass deposition the precursor for a dopant is introduced into the glass layers.

The term "dopant" as used herein means a compound or composition that is present in the glass of the optical fibre and that has an effect on the refractive index of the glass. Dopant, for example, may be a "down dopant", viz. a dopant decreasing the refractive index, such as Fluorine or Boron (e.g. introduced as a precursor in the form of $F_2$, $C_2F_8SF_6$, $C_4F_8$ or $BCl_3$). Dopant, for example, may be an "up-dopant", viz. a dopant increasing the refractive index, such as Germanium (e.g. introduced as a precursor in the form of $GeCl_2$ (germanium dichloride) or $GeCl_4$ (germanium tetrachloride)). Dopants can be present in the glass either in the interstices of the glass (e.g. in the case of F) or they may be present as an oxide (e.g. in the case of Germanium, Aluminium, Phosphorus or Boron).

The term "non-vitrified silica" is used interchangeably herein with the term "soot" and means incompletely vitrified (=not or partly vitrified) silica. It may be either undoped or doped.

The term "vitrified silica" is used interchangeable herein with the term "glass" and means a glassy substance produced by the complete vitrification of glass-forming compounds. It can be either undoped or doped.

The term "soot deposition" as used herein means the deposition of non-vitrified silica on the inner walls of the substrate tube. Soot deposition is visible to the eye as a white opaque fine particulate material.

The term "soot ring" as used herein means irregular glassified material manifested as an opaque ring on the inner surface of the hollow substrate tube. It should be noted that a soot ring is not constituted of fine particulate non-vitrified silica. A soot ring is hence not constituted of soot deposition as defined above.

The term "reaction zone" as used herein means the zone or axial location wherein the glass-forming reaction or deposition takes place. This zone is formed by a plasma and preferably moves reciprocally along the longitudinal length of the substrate tube.

The term "reaction conditions" as used herein means a set of conditions such as temperature, pressure, electromagnetic radiation that are used to effect the deposition of the silica layers (either non-vitrified or vitrified).

The term "plasma" as used herein means an ionized gas containing positive ions and free electrons in proportions resulting in more or less no overall electric charge at very high temperatures. The plasma is induced by electromagnetic radiation, preferably by microwaves.

The term "reversal point" as used herein means the axial point or position along the substrate tube at which the movement of the applicator reciprocates (i.e., changes from back to forth and forth to back, i.e., the turning point of the applicator). The axial point is measured at the longitudinal middle of the applicator.

The term "near the reversal point" as used herein means an axial position along the substrate tube that is close in distance to the reversal point or is the same position as the reversal point.

The term "at the reversal point" as used herein means an axial position along the substrate tube that is the same position as the reversal point.

The term "moved back and forth" as used herein means a reciprocating movement or moving backwards and forwards in a straight line.

The term "phase" as used herein means a part of the deposition process in which glass layers having a specific refractive index value are deposited. The specific value may be constant or exhibit a gradient. For example, for a simple step index fibre the deposition of the core and the deposition of the cladding are each considered a separate phase.

The term "stroke" or "pass" as used herein means each back and forth movement of the applicator along the length of the substrate tube.

The term "upstream" as used herein means in the direction of the supply side.

The term "downstream" as used herein means in the direction of the discharge side.

DETAILED DESCRIPTION OF THE INVENTION

The present invention relates, in a first aspect, to a method for manufacturing a precursor for a primary preform for optical fibres by means of an internal plasma deposition process. In one embodiment, the internal plasma deposition process is a plasma chemical vapour deposition (PCVD) process.

In a first step, the method includes providing a hollow glass substrate tube having a supply side and a discharge side. The hollow glass substrate tube is used for the internal deposition of glass layers on the inner surface thereof. A main gas line and at least one secondary gas line are attached to the supply side, and a vacuum pump is preferably attached to the discharge side.

In a second step, a first plasma reaction zone is created having first reaction conditions for effecting the deposition of non-vitrified silica layers on at least part or a portion of the inner surface of the substrate tube at or near a reversal point at the discharge side.

In a third step, subsequent to the second step, a second plasma reaction zone is created having second reaction conditions for effecting the deposition of vitrified silica layers on the inner surface of the non-vitrified silica layers deposited in the second step to obtain a substrate tube having deposited non-vitrified and vitrified silica layers.

In a fourth step, the substrate tube having the deposited non-vitrified and vitrified silica layers obtained in the third step is cooled. The precursor for a primary preform is taken out of the plasma deposition lathe, or left mounted in the plasma deposition lathe, to cool down in the surrounding air (i.e., no forced cooling is applied).

Employing the above method, layer cracking is reduced because the tension between the doped layers and the substrate tube is reduced due to the layer of non-vitrified silica present between the doped layer and the substrate tube.

The layer crack problem occurs particularly at the pump side of the deposition tube due to the position in the furnace (the edge of the furnace). Furthermore, once the tube is removed from the plasma deposition process and passively cooled the different coefficients of expansion of the doped layers and the substrate tube causes tension to occur between the layers. This tension can lead to a very quick breakage of the layers and often the substrate tube.

The reduction in tension between the layers is facilitated by the presence of a layer of soot (non-vitrified glass) between the inner surface of the substrate tube and the deposited glass layers. This silica soot has a certain adherence to the glass layers to be deposited and has a certain adherence to the substrate tube. It thus acts as a barrier between two vitrified parts, firstly the substrate, which is preferably a glass or silica-based substrate tube, and second on the glass layers that are deposited. This barrier layer acts as a non-stick layer or buffer layer that prevents cracks originating in a soot ring from propagating inside the deposited vitrified layers.

Gas flow includes at least one glass-forming gas, for example, oxygen and silicon tetrachloride. Optionally, the gas flow includes, during at least a part of the deposition process, at least one precursor for a dopant, such as germanium (e.g. in the form of germanium tetra- or dichloride) and/or fluorine (e.g. in the form of $C_2F_6$). In a specific embodiment, only oxygen is introduced first, and later optionally an etching gas, even later the glass forming gasses.

A plasma reaction zone is created in the interior of the hollow substrate tube. The plasma reaction zone does not span the full length of the substrate tube, but only the portion surrounded by the applicator. In other words, the plasma reaction zone is created in along a portion of the interior of the hollow substrate tube. The plasma is created by means of electromagnetic radiation. This plasma reaction zone provides conditions suitable for effecting the deposition of non-vitrified glass layers or vitrified glass layers, depending on the conditions, on the inner surface of the hollow substrate tube by allowing the reaction of the glass-forming gases and optionally one or more precursors for dopants. In other words, the plasma reaction zone is the three dimensional space taken up by the plasma inside of the substrate tube.

The reaction zone is preferably reciprocated between the two reversal points, each of which is located at or near the ends of the substrate tube. One reversal point is near the supply side and the other reversal point is near the discharge side. The applicator is present coaxially over the substrate tube. The plasma formed moves back and forth along the longitudinal axis of the hollow substrate tube together with the applicator. The movement reciprocates between the reversal point located near the supply side and the reversal point located near the discharge side of the hollow substrate tube. Reciprocation takes place a number of times (i.e., passes or strokes), and during each pass or stroke a thin layer of vitrified or non-vitrified glass is deposited. When the deposition process is carried out in several phases, each phase includes a plurality of strokes, for example between 1,000 and 10,000, for example, between 2000 and 4000 strokes.

During step ii), a first plasma reaction zone is provided for the deposition of non-vitrified glass. First reaction conditions are applied effective for the production of non-vitrified silica layers. In other words, the first reaction conditions prevent vitirifcation. A gas flow of glass-forming gasses is present during this step. In one embodiment high pressure (e.g., >50 mbar) is used to prevent vitrification. This is a consequence of the fact that the pressure determines the amount of silica formation in the gas phase. When the pressure in the substrate tube is low enough, only a small amount of soot ($SiO_2$ or $GeO_2$) will be formed in the gas phase. This soot will then stick to the surface of the substrate tube. If the pressure is higher than 50 mbar, there will be a significant amount of soot creation. The higher the pressure, the greater the soot deposition.

During step iii), a second plasma reaction zone, different from the first plasma reaction zone, is provided for depositing vitrified silica. Thus, this step entails creating a second plasma reaction zone having second reaction conditions, different from the first reaction conditions, in the interior of the hollow substrate tube for depositing vitrified glass layers on the non-vitrified silica layers deposited in the previous step ii). The second reaction conditions used during this step in order to obtain a plasma reaction zone suitable for the deposition of glass are known to those skilled in the art.

At the end of the second deposition step, a substrate tube having the desired number of vitrified silica layers deposited on the inner surface thereof is obtained. Deposition is stopped once the desired number of vitrified silica layers is obtained. The electromagnetic radiation is stopped as well as the gas flow comprising the glass-forming gases.

After the deposition steps, the precursor is then cooled in the surrounding air. Cooling may include passive cooling (i.e., no forced or applied cooling) or active cooling.

After cooling, the precursor for a primary preform may be subjected to a collapsing treatment to form a primary preform. During the optional collapsing step, the precursor for a primary preform is heated using an external heat source such as a furnace or burners configured to heat the precursor to a temperature between 1800-2200° C. In several strokes or collapsing passes, the hollow tube is heated and collapses onto itself to form a solid rod. It should be noted that any non-vitrified layers present in the precursor for a primary preform are also vitrified during this collapsing step due to the temperature.

Optionally, the deposited tube or primary preform obtained may be externally provided with an additional amount of glass, for example by means of an external vapour deposition process or direct glass deposition process (so-called "overcladding") or by using one or more preformed glass tubes that are provided over the outside surface of the primary preform obtained according to the method of the present invention. This process is called "sleeving". When a solid rod is used as the starting point, a composite preform called the final preform is obtained. In the method according to the present invention, this step of externally providing extra glass can be carried out using doped glass. In a preferred embodiment, the overcladding process uses natural or synthetic silica (doped or undoped). In a particular embodiment, Fluorine doped silica may be used in the overcladding process (e.g., to obtain an optical fiber having a buried outer optical cladding).

Optical fibres can be drawn from a heated end of the final preform. The refractive index profile of the consolidated (collapsed) preform corresponds to the refractive index profile of the optical fibre drawn from such a preform.

The methods according to the present invention may include the optional step of etching away the non-vitrified silica layers deposited in step ii) along at least part or a portion of the inner surface of the substrate tube. The optional etching step takes place after step ii) and before step iii). The non-vitrified silica layers are etched away along a portion of the length of the substrate tube such that the non-vitrified layers are not present throughout the entire length of the tube, but only at the positions where layer cracking typically occurs, for example, in areas containing a high percentage of dopants. Etching gases may include, but are not limited to, $CF_4$, $C_2F_4$, $SF_6$, $C_2Cl_2F_2$, $F_2SO_2F_2$, and combinations thereof.

The methods according to the present invention may include the optional step, carried out between step ii) and step iii), of vitrifying the non-vitrified silica layers deposited in step ii) along at least part of the inner surface of the substrate tube. As a result, the vitrified and non-vitrified layers are indistinguishable in the final preform, thus making the primary preform suitable for a wide range of applications.

WORKING EXAMPLES

Example 1

A silica substrate tube was placed in a PCVD lathe surrounded by a furnace. The furnace was brought up to a temperature of 1100° C. while oxygen flowed through the substrate tube at a pressure of 15 millibar. The resonator reciprocated between a reversal point near the gas supply side and a reversal point near the gas discharge side at a speed of approximately 20 meters/minute. A plasma was induced and the pressure was increased to 60 millibar. Approximately 20 layers of non-vitrified undoped silica were deposited within a period of 2 minutes. The pressure was subsequently decreased to approximately 14 millibar and approximately 5000 layers of vitrified silica with increasing dopant concentration were deposited. When deposition finished, the tube was left in the PCVD lathe with the furnace lifted so that the furnace was no longer surrounding the substrate tube, to cool down in the surrounding air (no forced cooling was applied). When the tube reached room temperature (−23° C.) no cracking of the deposited vitrified layers was observed. After cooling, the substrate tube with the deposited layers on the inner diameter was placed in a collapsing apparatus and collapsed to provide a solid core rod.

Example 2

A silica substrate tube was placed in a PCVD lathe surrounded by a furnace. The furnace was brought up to a temperature of 1100° C. while oxygen flowed through the substrate tube at a pressure of 15 millibar. The resonator reciprocated between a reversal point near the gas supply side and a reversal point near the discharge side at a speed of approximately 20 meters/minute. A plasma was induced and the pressure was increased to 60 millibar. Approximately 30 layers of non-vitrified undoped silica were deposited in a period of 2 minutes. After depositing the layers of non-vitrified silica, the reversal point at the gas supply side was shifted 40 mm downstream the substrate tube and the reversal point at the discharge side was shifted 40 mm upstream the substrate tube. The pressure was subsequently decreased to approximately 14 millibar and a flow of oxygen containing $C_2F_6$ as etching gas was injected in the substrate tube while the plasma reciprocated until the non-vitrified silica was etched away in the area between the shifted reversal points. Thereafter, the reversal points were shifted to their original positions and approximately 5000 layers of vitrified silica were deposited with increasing dopant concentrations. When the complete process was finished, the tube was left in the PCVD lathe with the furnace lifted so that the furnace was no longer surrounding the substrate tube, to cool down in the surrounding air (no forced cooling was applied). When the tube reached room temperature (−23° C.) no cracking of the deposited vitrified layers was observed. After cooling, the substrate tube was placed in a collapsing apparatus and collapsed to provide a solid core rod.

Example 3

A silica substrate tube was placed in a PCVD lathe surrounded by a furnace. The furnace was brought up to a temperature of 1100° C. while oxygen flowed through the substrate tube at a pressure of 15 millibar. The resonator reciprocated between a reversal point near the gas supply side and a reversal point near the discharge side at a speed of approximately 20 meters/minute. A plasma was induced and the pressure was increased to 60 millibar. Approximately 10 layers of non-vitrified undoped silica were deposited in a period of 2 minutes. After depositing the layers of non-vitrified silica, the reversal point at the gas supply side was shifted 40 mm downstream the substrate tube and the reversal point at discharge side was shifted 40 mm upstream the substrate tube. A flow of oxygen was introduced in the substrate side while the plasma reciprocated until the non-vitrified silica was vitrified in the area between the shifted reversal points.

What is claimed is:

1. A method for manufacturing a primary preform for optical fibres by an internal plasma deposition process, comprising the steps of:
    (i) providing a hollow substrate tube;
    (ii) depositing a plurality of non-vitrified silica layers on an inner surface of the hollow substrate tube by inducing a plasma with electromagnetic radiation with first reaction conditions and depositing a plurality of vitrified silica layers on the substrate tube having non-vitrified silica layers on at least a part of its inner surface by inducing a plasma with electromagnetic radiation with second reaction conditions;
    (iii) cooling the substrate tube of step (ii) having the plurality of non-vitrified and vitrified silica layers deposited on the inner surface of the hollow substrate tube thereby producing a precursor for a primary preform; and
    (iv) collapsing the precursor for the primary preform produced in step (iii) thereby forming the primary preform, wherein:
    any non-vitrified layers remaining in the precursor for the primary preform are vitrified during the collapsing of step (iv) while forming the primary preform.

2. The method of claim 1, wherein the first reaction conditions are different from the second reaction conditions.

3. The method of claim 1, wherein at least a portion of the vitrified silica layers are deposited on top of at least a portion of the non-vitrified silica layers.

4. The method of to claim 1, wherein the first reaction conditions comprise a pressure greater than 30 millibar.

5. The method of claim 1, wherein the first reaction conditions comprise a pressure greater than 60 millibar.

6. The method of claim 1, wherein the second reaction conditions comprise a pressure between 1 and 25 millibar.

7. The method of claim 1, wherein the second reaction conditions comprise a pressure between 10 and 15 millibar.

8. The method of claim 1, wherein the first reaction conditions comprise a pressure lower than 1000 millibar.

9. The method of claim 1, wherein the first reaction conditions comprise a pressure lower than 200 millibar.

10. The method of claim 1, wherein between 1 and 200 non-vitrified silica layers are deposited in step ii), and wherein each of the non-vitrified silica layers have a thickness between 1 and 5 micrometers.

11. The method of claim 1, wherein a total thickness of all the non-vitrified silica layers deposited in step ii) is between 1 and 400 micrometers.

* * * * *